April 17, 1945.  C. IVERSON  2,374,099
VULCANIZING PRESS
Filed Oct. 17, 1938  2 Sheets-Sheet 1

INVENTOR
CATO IVERSON
BY
Ralph Barrow
ATTORNEY

April 17, 1945.                     C. IVERSON                        2,374,099
                                 VULCANIZING PRESS
                               Filed Oct. 17, 1938                  2 Sheets-Sheet 2

INVENTOR
CATO IVERSON
BY J. Ralph Barrow,
ATTORNEY

Patented Apr. 17, 1945

2,374,099

UNITED STATES PATENT OFFICE 2,374,099

VULCANIZING PRESS

Cato Iverson, Akron, Ohio, assignor to National Rubber Machinery Company, Akron, Ohio, a corporation of Ohio Application October 17, 1938, Serial No. 235,342

10 Claims. (Cl. 18—17)

This invention relates to vulcanizing presses and in particular relates to presses for use in vulcanizing pneumatic tires or similar articles.

A general object of the invention is to provide in presses of the character described improved effective mechanism for automatically stripping the finished product therefrom.

A particular object of the invention is to provide mechanism in a tire vulcanizing press for automatically stripping pneumatic tires or like articles from the press after the tire has been vulcanized.

These and other objects will be manifest from the following brief description and the accompanying drawings.

Figure 1:
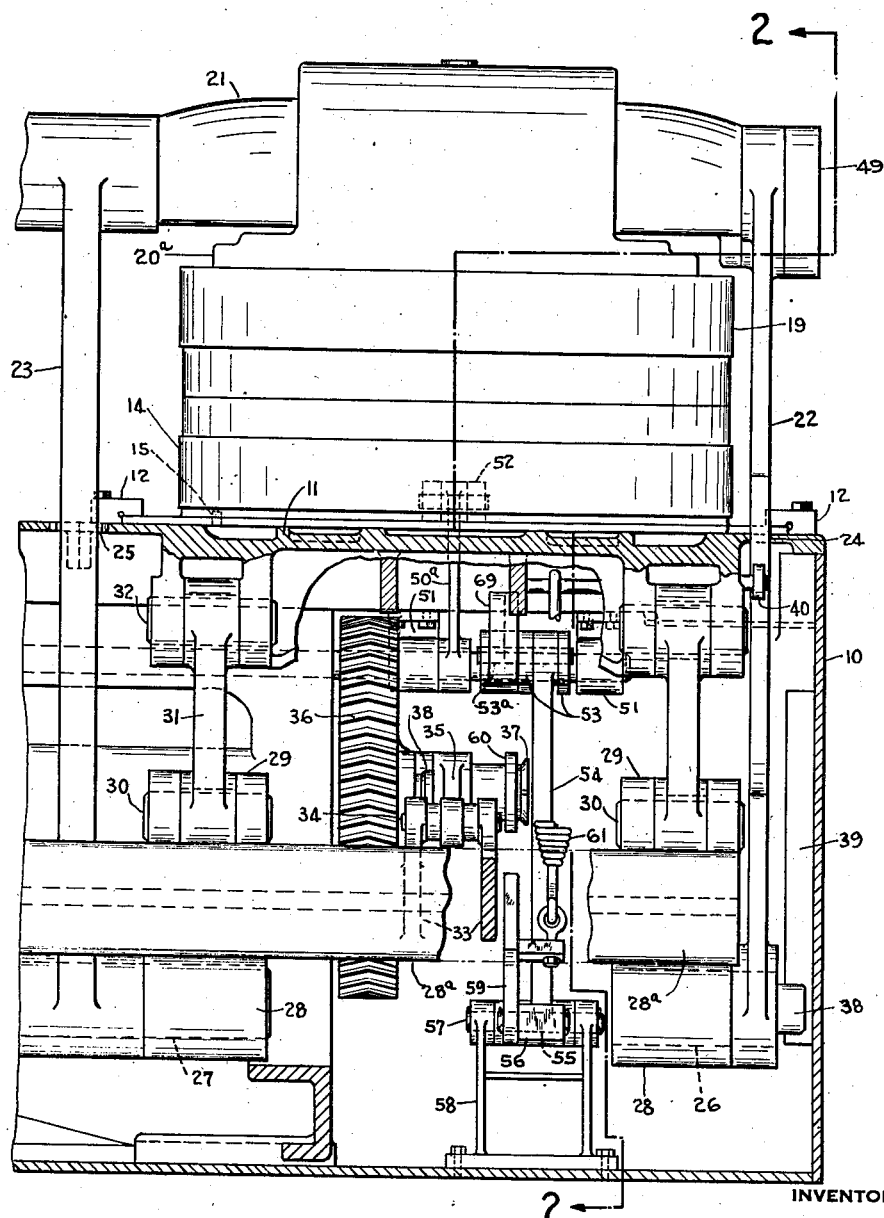
Figure 1 is a front elevation, partly broken away and in section, of one vulcanizer unit embodying the invention, and shown in closed position thereof, said unit being part of a duplex tire-vulcanizing press.

Referring to the drawings, the numeral 10 designates a suitable housing to the top of which is secured a lower platen 11. Fixed to platen 11 may be guide members 12, 12 for slidably retaining flanges 13, 13 of a lower mold section 14, the arrangement being such that the latter may be moved horizontally from the chain-dotted to the full line positions shown in Figure 2. One or more pins 15 in platen 11 may engage through slots 16 in the rear flanges 13 to limit the laterial movement of the mold section 14. Mold section 14 preferably is insulated at 17, 17 and chambered at 18 for circulation of steam or other heat vulcanizing medium.

Adapted to be in registry with lower mold section 14, in press-closed position thereof, is an upper mold section 19 insulated at 20 and steam chambered at 21 in a similar manner to the lower mold section. Suitable flexible piping (not shown) supplies the heating medium to both upper and lower mold sections. Upper mold section 19, carried by an upper platen 20ª, may be adjustably secured on a press head 21 which is pivotally supported at 21ª on side arms 22 and 23, arm 23 in the case of the present duplex press being a common support for two adjacent upper mold sections. Arms 22 and 23 may extend downwardly through openings 24 and 25 in the lower platen 11, the openings 24 being adapted to engage the sides of arms 23 to prevent sidewise movement thereof, and the arms 23 having the lower ends thereof pivotally connected, by means of pins 26 and 27, to the lower links 28, 28 of press-operating toggle mechanism 29. Links 28 may be inter-connected to operate in unison by having a cross-member 28ª integral therewith.

The toggle mechanism 29 and the operating means therefor may be substantially as shown and described in the co-pending application of Cato Iverson, Serial No. 137,947, filed April 20, 1937. Lower links 28 preferably are pivotally connected by means of pins 30 to upper links 31 in turn pivotally connected at 32 to the underside of platen 11. Integral with cross-member 28ª may be inwardly extending pairs of bracket arms 33, the free ends thereof being pivotally connected by pins 34, preferably eccentrically of knuckles or pins 30 to pitmans 35. The pitmans 35 preferably are operable by being connected to a gear 36 through pin 37 secured thereto concentrically of its shaft 38. Gear 36 may be driven through a reversing type motor and speed reducer (not shown) controlled by suitable timing mechanism (not shown), to open and close the press automatically in timed cycles.

For guiding the lower ends of arms 22 in vertical direction during the press-opening and closing movements thereof, there may be provided on the pins 26, rollers 38 engageable between pairs of guide bars 39, 39 on housing 10. Rollers 40, 40 mounted on lower platen 11 preferably are arranged to be in engagement with edge faces 41 and 42 of side arms 22 to maintain them, and consequently arm 23, in vertical relation during the initial opening and final closing movements of the upper mold section.

Figure 2:
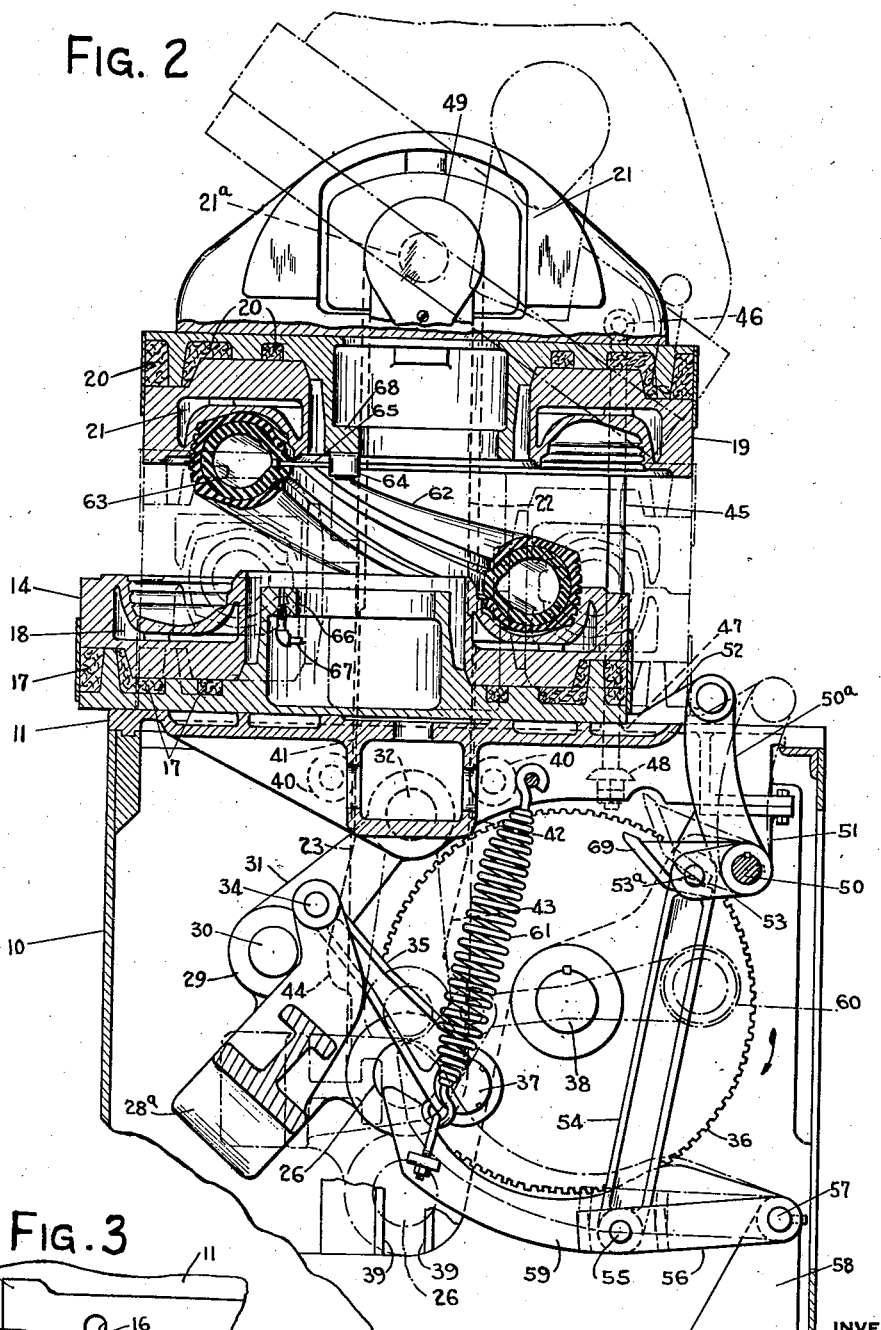
Figure 2 is a cross-section taken substantially on line 2—2 of Figure 1, but in the partly open, tire stripping position of the press.
Figure 3:
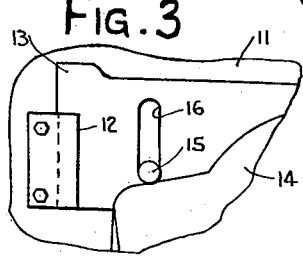
Figure 3 is a fragmentary plan view taken at the left rear of Figure 1 to illustrate the means for limiting horizontal movement of the lower mold sections.

In order to permit the press to be opened wide, as shown in chain-dotted lines in the upper portion of Figure 2, to facilitate insertion and removal of tires, cleaning and treating the mold surfaces, etc., the edge faces 42 of arms 22 may be recessed at 43 to permit the arms 22 and 23 to swing rearwardly on pivots 26 held between the guides 39. The edge faces 41 of arms 22 may be provided with projections 44 to engage the forward rollers 40 during rearward swinging of the arms 22 and 23 to prevent jerking thereof. As the upper mold section 19 approaches the fully opened position a rod 45, pivotally connected at 46 at the rear of the upper platen 20ª and extending downwardly through an opening 47 in lower platen 11, may be provided having a stop member 48 arranged to engage the under side of platen 11, and thereby tilt the upper platens 20ª on the arms 22 and 23 against yielding action of a spring (not shown) in a housing 49 secured to arms 23.

For moving the lower mold section 14 transversely on platen 11, there preferably is provided a shaft 50, journalled in brackets 51, 51 having keyed thereto an upwardly extending arm 50ª pivotally connected to lugs 52, 52 on lower mold section 14. An arm 53, also keyed to shaft 50, may have pivotally connected thereto at 53ª a link 54 extending downwardly to be similarly connected at 55 to the free end of an arm 56, fixed on a shaft 57 journalled in a bracket 58 mounted in housing 10. Also fixed on shaft 57 may be a cam plate 59 extending forwardly of the press and arranged to swing with the arm 56. The upper face of cam 59 preferably is shaped to be engageable by a roller 60 on shaft 37 as the latter swings clockwise in an arc about shaft 38 from the fully closed position to the intermediate open position, shown in chain-dotted and full lines, respectively, in Figure 2. The arrangement is such that roller 60 starts to press cam 59 downwardly against the yielding action of a spring 61 extending between cam 59 and platten 11, as soon as upper mold section 19 has moved upwardly out of registry with lower mold section 14 a sufficient distance that the latter may freely be moved forward of the press in the guides 12 upon downward pull of the link 54 actuated by cam 59.

Continued clockwise rotation of gear 36, carrying pitmans 35, completely collapses toggle 29, thereby carrying arms 22 and 23 upward to fully open position, at which time the fore-mentioned press control device stops the press-operating mechanism for removal of the vulcanized tire 62, with pressure bag 63 therein, and placing of another uncured tire and contained bag in the lower mold cavity preparatory to the next tire vulcanizing cycle. As toggle mechanism 29 is thus moving from the full line position shown in Figure 2 roller 60 disengages cam 59 whereby spring 61 urges the latter, together with arm 56 and associated parts thereof, to bring lower mold section 14 back to its normal position, shown in chain-dotted lines.

When another uncured tire carcass 62 and contained bag 63 has been properly positioned in the lower mold cavity, with valve-block 64 on pressure bag valve stem 65 placed on lug 66 on lower mold section 14 to communicate with a suitable pressure supply line 67, the block 64 being arranged to be pressed in sealed condition between lug 66 and a lug 68 on upper mold section in the fully closed position of the press, the press is then operated by a push button (not shown) to cause the drive mechanism to straighten the toggle 29. This closes the press and the timer is automatically actuated to cause application of pressure fluid through pipe 67 and valve 64 to bag 63 and another vulcanizing period is started.

To assure accurate registry of the upper and lower mold sections, in closed position thereof, there may be fixed on shaft 50 a cam 69 adapted to be engaged by roller 60 during its press-closing movement, to thereby urge arm 50ª and connected lower mold section 14 rearwardly until stop pin 15 hits the rear end of slot 16 in flanges 13.

In the apparatus shown and described an efficient and effective means for ejecting the tire 62 after vulcanization has been provided. By reference to chain-dotted and full line positions in Figure 2 it readily is seen that as the upper and lower mold sections simultaneously move respectively in vertical and transverse directions, pressure is applied to the tire by the mold sections at diametrically opposite points adjacent the tread portions thereof, these points in the present case being located forwardly of the upper mold cavity and rearwardly of the lower mold cavity. Consequently, a squeezing action between these two diametrically opposite points very effectively loosens the tread portions from the respective mold cavities during the initial opening stages of the mold sections 14 and 19, and continued opening movement of the upper mold section and simultaneous recession of the lower mold section, during the final opening stages of the press, cause the tire 62 to separate from the upper section readily to be removable for insertion of another uncured carcass in the press.

Modifications of the invention may be resorted to without departing from the spirit thereof or the scope of the appended claims.

What is claimed is:

1. In a tire vulcanizing press of the character described, relatively movable, axially aligned, cooperating cavity members adapted to embrace the opposite sides of a tire vulcanized in said press, means for relatively moving a first of said members from and toward the other, and means operable by said member moving means for relatively moving said other member laterally a substantial distance out of axial alignment with said first member as the latter is moved away from said other member to loosen said tire in the cavities, said last-named means including a device for delaying said lateral movement during the initial separating of the cavity members to permit the cooperating parts thereof to clear each other before said members move out of said axial alignment.

2. In a tire vulcanizing press of the character described, relatively movable, axially aligned, cooperating cavity members adapted to embrace the opposite sides of a tire vulcanized in said press, means for relatively moving a first of said members from and toward the other in parallelism, and means for relatively moving said other member laterally a substantial distance out of axial alignment with said first member as the latter is moved away from said other member to loosen said tire in the cavities, and means for delaying said lateral movement during the initial separating of the cavity members to permit the cooperating parts thereof to clear each other before said members move out of said axial alignment.

3. In a tire vulcanizing press of the character described, relatively movable, axially aligned, cooperating cavity members adapted to embrace the opposite sides of a tire vulcanized in said press, means for relatively moving a first of said members from and toward the other in parallelism, means for relatively moving said other member laterally a substantial distance out of axial alignment with said first member as the latter is moved away from the other member to loosen said tire in the cavities, and means for tilting said first cavity member out of parallelism with said other member thereby to release said tire and permit removal thereof from the press.

4. In a tire vulcanizing press of the character described, relatively movable, coaxially aligned, cavity members embracing the opposite sides of a tire vulcanized therein, means for relatively moving a first of said members from and toward the other, means for relatively moving said other member laterally out of axial alignment with said first member as the latter is moved away from the other member, thereby to compress the tire between diametrically opposite areas of the tread surface thereof, and means operable to return said other member laterally to normal position during the final opening movement of said first member and thereby to release said tire from said compressed condition to permit removal thereof from the press.

5. In a tire vulcanizing press of the character described relatively movable, coaxially aligned, cavity members embracing the opposite sides of a tire vulcanized therein, means for relatively moving a first of said members from and toward the other, and means operable by said member moving means for relatively moving said other member laterally a substantial distance out of axial alignment with said first member as the latter is moved away from the other member, thereby to compress the tire between diagonally opposite areas of the tread thereof and means operable to return said other member to normal position during subsequent opening movement of said first member thereby releasing said tire from said cavities to permit removal therefrom, said lateral movement being delayed during the initial separating of the cavity members to permit the cooperating parts thereof to clear each other before said members move out of axial alignment.

6. In a tire vulcanizing press of the character described relatively movable, axially aligned, cooperating annular cavity members adapted to embrace the opposite sides of a tire vulcanized in said press, means for relatively moving a first of said members from and toward the other, means operable by said first member moving means for yieldably relatively moving said other member laterally a substantial distance out of axial alignment with said first member as the latter is moved away from the other member to thereby distort said tire and loosen it in said cavities, and yieldable means normally urging said other member laterally into axial alignment with said first member.

7. In a tire vulcanizing press of the character described relatively movable, axially aligned, cooperating annular cavity members adapted to embrace the opposite sides of a tire vulcanized in the press, means for relatively moving a first of said members from and toward the other, means operable by said first member moving means for yieldably relatively moving said other member laterally a substantial distance out of axial alignment with said first member as the latter is moved away from the other member, thereby to compress the tire between diametrically opposite areas of the tread surface thereof, yieldable means normally urging said other member laterally into axial alignment with said first member, and means operable by said first member moving means during the closing movement of said press to urge said other member into positive axial alignment with said first member.

8. In a tire vulcanizing press of the character described, relatively movable, axially aligned, cooperating annular cavity members adapted to embrace the opposite sides of a tire vulcanized in said press, means for relatively moving a first of said members from and toward the other in parallelism, means for relatively moving said other member laterally a substantial distance out of axial alignment with said first member during initial opening movement of the press, to thereby distort said tire and loosen it in said cavities, and means for urging said other member laterally into axial alignment with said first member during subsequent opening movement of the press, said lateral moving means including means for maintaining said axial alignment during initial separation of the cavity members until the cooperating parts thereof may freely pass each other.

9. In a tire vulcanizing press of the character described relatively movable, axially aligned, cooperating annular cavity members embracing the opposite sides of a tire which has been vulcanized, means for relatively moving a first of said members from and toward the other in parallelism, means operable by said first member moving means during initial opening movement of the press for relatively moving said other member laterally out of axial alignment with said first member as the latter is moved away from the other member a sufficient distance to thereby distort said tire and loosen it in said cavities, means for urging said other member laterally into axial alignment with said first member during subsequent opening movement of the press to release the tire from between said cavity members, and means for tilting said first cavity member out of parallelism during the final opening movement thereof.

10. In a tire vulcanizing press of the character described, relatively movable, axially aligned, cooperating cavity members adapted to embrace the opposite sides of a tire vulcanized in said press, means for relatively moving a first of said members from and toward the other, and means for relatively moving said other member laterally a substantial distance out of axial alignment with said first member as the latter is moved away from said other member and while both cavity members are embracing the tire in slightly separated positions to loosen said tire in the cavities.

CATO IVERSON.